(12) United States Patent
Feraud et al.

(10) Patent No.: US 6,306,799 B1
(45) Date of Patent: Oct. 23, 2001

(54) COMPOSITIONS FOR IRON CONTROL IN ACID TREATMENTS FOR OIL WELLS

(75) Inventors: Jean Pierre Feraud, Tulsa, OK (US); Herve Perthuis, Saint Etienne; Philippe Dejeux, St Priest en Jarez, both of (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 07/889,543

(22) Filed: May 27, 1992

(30) Foreign Application Priority Data

Jun. 3, 1991 (FR) .................................................. 91 06774

(51) Int. Cl.[7] .............................. C09K 3/00; E21B 43/17; E21B 21/00
(52) U.S. Cl. ........................... 507/90; 507/267; 507/272; 507/277; 507/923; 507/932; 166/308; 166/311; 166/312
(58) Field of Search ........................... 252/8.553; 507/90, 507/267, 272, 277, 923, 932, 937; 166/308, 311, 312

(56) References Cited

U.S. PATENT DOCUMENTS

| | | | |
|---|---|---|---|
| 3,773,465 | * | 11/1973 | Keeney et al. ....................... 21/2.7 R |
| 4,661,266 | * | 4/1987 | Kanda et al. ....................... 252/8.551 |
| 5,264,141 | * | 11/1993 | Brezinski et al. ................. 252/8.552 |

FOREIGN PATENT DOCUMENTS

| | | | |
|---|---|---|---|
| 2677074 | * | 4/1992 | (FR) . |
| WO 93/06338 | * | 4/1993 | (WO) . |

* cited by examiner

Primary Examiner—Porfirio Nazario-Gonzalez
(74) Attorney, Agent, or Firm—Doug Y'Barbo; Robin C. Nava; John J. Ryberg

(57) ABSTRACT

The invention relates to iron control in an acid medium for forestalling the formation of precipitates known as "sludges" (asphaltic products) in contact with certain crude oils. Use is made of compounds comprising a mercaptan function, and, in combination, a selection of catalysts. Application to acid treatments for oil, gas, water, geothermal and analogous wells, as well as to industrial cleaning.

8 Claims, No Drawings

COMPOSITIONS FOR IRON CONTROL IN ACID TREATMENTS FOR OIL WELLS

The present invention relates to the technical field of acid treatments designed to stimulate the production of oil, gas, water, geothermal and analogous wells, as well as to that of industrial cleaning.

The objectives and techniques of acid well treatment are very familiar to a man of the art and it is quite unnecessary to reiterate them here. It will simply be recalled that the acid fluids pumped into the well and into the adjacent formations are of a very special nature in that they are of extremely high acidity.

Acid treatments are accompanied by very familiar problems linked with the presence of iron in the acid that is pumped into the formations, essentially as a result of the acid dissolving the rust in the casings during pumping, and possibly the dissolving of iron-containing minerals in formation.

The presence of iron (III) in the injected acid causes, in contact with certain crude oils, the precipitation of the asphaltic products contained in the oil in the form of deposits of a vitreous aspect known as "sludges", which leads to practically irreversible damage to the zone treated; the scale of precipitation generally increases with the strength and concentration of the acid.

The dispersibility of customary additives, such as surfactants, is also affected by the presence of iron (III) through the formation of complexes.

When the injected acid is consumed by the dissolution of the minerals of the formation, the presence of iron (III) leads to the precipitation of a colloidal precipitate of ferric hydroxide which damages the formation.

In the particular case of wells containing hydrogen sulphide, the ferric hydroxide precipitate does not occur as a reducing medium is involved, but other damaging precipitations, such as that of colloidal sulphur, can also occur in the absence of iron control agents.

The use of iron control additives is thus necessary in most acid treatments, with a view to removing the majority of the free iron (III) in the treatment acid.

The conventional complexing agents of the soluble forms of iron, such as the aminopolycarboxylic acid derivatives, citric acid, acetic acid or salicylic acid only lead to the formation of stable complexes in a medium that is not very acid, and can only serve, therefore, to mask the iron in the spent acid, and they are ineffectual in preventing the formation of sludges induced by contact with certain crude oils and the pumped acid that still has a concentration close to initial concentration.

As a variant, liquid-liquid extraction of iron (III) in the organic phase, in processes including the injection of suitable solvents, has also been proposed after complexing with certain of these complexing products, but the efficiency of the process is only proven in a spent acid medium and is limited to low dissolved iron (III) contents.

The usual reducing agents for iron (III) are also generally more efficient in partially spent acids than in acids that have not reacted; in a highly acid medium, we often observe reduction kinetics that are too slow for thermodynamically possible reactions to enable sludge formation to be efficiently prevented under acid treatment conditions. Furthermore, the chemical and/or thermal stability of the reducing agents considerably limits their use in a very acid medium. Thus, sulphur base mineral reducing agents (sulphites, hydrosulphites, etc.) are unstable in an acid medium.

Organic reducers are often limited by the kinetics of their reactions, and by their limited chemical stability in a highly acid medium and in terms of temperature. Thus, the erythorbic or ascorbic acid, frequently used in acid treatments, can forestall the precipitation of ferric hydroxide in the spent acid, but they can sometimes present serious shortcomings as regards quickly reducing the iron in a highly acid medium, and thus forestalling sludge formation.

Similarly, the nitrogen or phosphorous base reducing systems have slow reduction kinetics in an acid medium. The use of oxidation reduction catalysts can permit a considerable acceleration of the reduction kinetics; the process is well known, for example, in the field of nickel plating, in which metallic salts are added to baths of hypophosphorous acid. The catalysing electrochemical couple must possess fast kinetics and an intermediate potential between those of Fe (III)/Fe (II) and of the reducing system selected.

The present invention represents a decisive improvement in the control of precipitations due to iron in the acid treatments and of the incompatibilities observed simultaneously. It comprises the use of a selected catalytic system combined with that of a selection of reducing products with the aim of removing the ferric ions of the acid solution practically instantaneously during pumping, thus avoiding the formation of sludges in contact with certain crude oils owing to the presence of iron (III) in the acid, opening up, moreover, new applications, some of which will be mentioned hereinafter, and the poor dispersibility of certain additives of acid solutions, as well as the subsequent formation of mineral precipitates in the course of neutralization of the acid following its coming into contact with the minerals.

It has been discovered, according to the invention, that the mercaptan function, i.e. HS- bonded to an aliphatic group with a straight or branched chain, possibly cyclic, and having sufficient hydrophilic groups to ensure solubility, would enable the above objectives to be attained with a degree of efficiency never hitherto achieved.

The examples given below show that the mercaptan function HS- in itself appears to be responsible for the decisive progress achieved.

This progress appears to be essentially linked to the far swifter reduction of far larger quantities of Fe (3+) by comparison with prior art. Furthermore, this property is not affected by the presence on the aliphatic chain of the usual hydrophilic group(s) such as —OH, —NH$_2$,

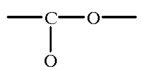

(acid or salt, particularly of Na, Ca, NH$_4$ and the like),

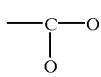

(ester) which are naturally desirable since the acid fluid pumped is an aqueous medium.

The advantages of the mercaptan function used for iron control in an extremely acid medium, and most especially in an acid medium containing HCl, in the petroleum and associated fields, as well as in industrial cleaning, are numerous and form a group of properties never before obtained in this industry.

These properties will be quite especially appreciated in the acid treatment of oil and analogous wells where, in particular, the precipitation of "sludges" (precipitation of asphaltic products) has been of serious concern to operators for very many years.

On one hand, the reaction is quantitative. The compositions according to the invention are thus efficient up to Fe (3+) concentrations that were found absolutely impossible to treat hitherto.

Thus, certain prior art techniques can act more or less efficiently upon Fe (3+) concentrations not exceeding approximately 15 000 ppm in an acid medium. On the other hand, in an aqueous solution of 15% hydrochloric acid, the compositions according to the invention efficiently control Fe (3+) up to concentrations in the order of 100 g/l, or 100 000 ppm. This leads, among other advantages (notably the absence of "sludges"), to that of being able, in acid treatment operations, to dispense with the prior, extremely costly stage of well cleaning.

Indeed, controlling such concentrations means that even Fe (3+) from rust deposits, etc. will be controlled efficiently, for the first time.

Secondly, the compositions according to the invention remain efficient even in the presence of $H_2S$ (no sulphur precipitate).

They further have the advantage of being extremely stable in the highly acid medium under consideration, even under hot conditions, which is also an important parameter for operators in the field.

The mercaptan function is, of course, known for its reducing properties, but only in a basic medium, as well as in a very slightly acid or neutral medium, and in a completely different application, the object being to oxidize the SH groups in order to remove them.

In a highly acid medium (above an acidity corresponding to 3–4% HCl), there was, on the contrary, every reason to anticipate a risk of sulphur precipitation (clearly unacceptable in the treatment of a well owing to the risk of irreparable damage to the reservoir by the precipitate).

It will be noted that the technology according to the invention is quite particularly useful in the presence of $H^+$ and $Cl^-$ ions (i.e. notably in the presence of hydrochloric acid in the acid fluid used in treatment) as this combination of $H^+$ and $Cl^-$ ions is the main cause of the great difficulty experienced in the reduction of Fe (3+).

Another essential aspect of the invention, apart from the mercaptan function, relates to the choice of the catalysts of the reaction reducing Fe 3+ to Fe 2+.

Numerous catalysts of such reactions are known in the literature.

The tests conducted on the products used according to the invention, presenting a mercaptan function, have nonetheless shown, contrary to what is observed for the reactions known in the prior art, that:

a) the choice of catalyst or of the catalytic system is a function of the acidity of the pumped acid fluid; and that:

b) only copper or copper combined with iodine are suitable.

It is quite surprising to find that other known catalysts, such as Ni, Mn, Ce, Zn, Co, Sn, V, Cr, Ti, etc. are ineffectual (although not notably affecting the reaction).

Thus, for a 5% acid, the catalyst must be copper. Iodine alone is not suitable.

This is still true for a 15% acid.

On the other hand, in the case of a 28% acid, copper alone or iodine alone are ineffectual; only the combination of iodine and copper gives a suitable result.

This copper+iodine combination is also efficient in the case of less concentrated acids. However, when copper alone is efficient, it is not economical to choose the copper+iodine combination.

According to one of its aspects, the invention thus relates to new compositions for iron control and sludge prevention in the petroleum and related fields, as well as to applications in industrial cleaning, characterized in that they contain at least one compound having a mercaptan function and a catalytic quantity of copper or of copper combined with iodine.

In the present application, the term "copper" designates cuprous or cupric ions, and "iodine" designates iodine or iodide ions; as well, of course, as any compound generating in situ the chemical entities defined hereabove.

The compounds under consideration being reducers reacting mole by mole with the ferric iron, a minimum concentration corresponding to the stoichiometry is necessary. It may be of interest to increase the reducing agent concentration to accelerate the reduction kinetics of the Fe 3+. Conversely, in certain cases, there may be reason not to seek to reduce the iron (III) in its totality. In the case of a commercial aqueous solution of 60% by weight ammonium thioglycolate, for example, the reducing agent concentrations will vary typically from 0 to 200 kg/m³ to control from 0 to 50 000 ppm of iron (III) in the treatment acid.

Thus, 10 ml of $FeCl_3$ with 100 g/l iron (III) in 15% HCl are reduced in less than one minute by 4 ml of 60% ammonium thioglycolate, in the presence of 0.015 ml of $CuCl_2$ molar, at 20° C.

In the case of acids necessitating only a copper salt based catalytic system, the concentrations required for the reduction of iron (III) in less than two minutes after mixing will be, for example, from 0 to 1.7 kg/m³ of dihydrate cupric chloride to control from 0 to 50 000 ppm of iron (III) in the acid. In the case of highly concentrated (for example 28%) hydrochloric acid, the catalytic system will be constituted, for example, by the mixture of 0 to 10 kg/m³ of dihydrate cupric chloride and 0 to 5 kg/m³ of potassium iodide to control respectively from 0 to 50 000 ppm of iron (III) in the acid.

Thus:

10.7 ml of a solution of $FeCl_3$ having 14 g/l of iron (III) in a 28% HCl medium are reduced by 0.46 ml of 60% ammonium thioglycolate, in less than two minutes in the presence of 0.16 ml of $CUCl_2$ molar and of 0.08 ml of KI molar, at 20° C.

11 ml of a 14 g/l iron solution in a 15% HCl medium are reduced in less than two minutes by 0.46 ml of 60% ammonium thioglycolate in the presence of 0.02 ml of $CuCl_2$ molar, at 20° C.

A man of the art will appreciate that the quantities of reducing agent(s) and catalyst(s) can be higher than those recommended hereabove, in order, possibly, to adjust to best advantage the reactional parameters to the treatment contemplated. It will also be clear that there is a natural economic limit that a man of the art will be in a position to appreciate.

The reducing agents used according to the invention correspond to the following formula:

wherein R represents an aliphatic, possibly cyclic group having at least one hydrophilic function;

a —$CH_2$—Z group, wherein Z can be an aromatic or other group, having at least one hydrophilic function, it being essential for the whole not to affect the function of the mercaptan group, the methylene group being possibly substitutable, by a substitution not affecting the function of the mercaptan group.

The following examples illustrate the invention without, however, limiting the scope thereof.

Representative examples of the reducing agents with a mercaptan function that can be used according to the invention are as follows:

A. HS—CH$_2$—COOH

A'. or its ester "—COOCH$_3$ (or lower alkyl)

A". or a salt "—COO—NA$^+$, Ca$^{++}$, NH$_4^+$

B.

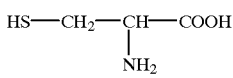

and its Na, Ca, NH$_4^+$ salts or lower alkyl esters)

C. HS—CH$_2$—CH$_2$—OH

D. HS—CH$_2$—CH$_2$—NH$_2$

E.

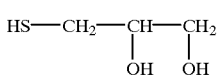

F. CH$_3$—CH(SH)—COOH (and its Na, Ca, NH$_4^+$ salts or lower alkyl esters)

A man of the art will easily be able to envisage the technical equivalents of the above compounds, which also form part of the invention.

Among such equivalents, we could cite, for example, the lower alkyl esters, such as ethyl, the longer —(CH2)— chains, as well as all substitutions by groups not liable to modify the function of the mercaptan group, and also the replacement of the COOH, OH, NH$_2$ COO(ester) hydrophilic groups by other compatible hydrophilic groups, for example sulfonate, phosphonate and the like. It will also be obvious to the man of the art that, if the —(CH$_2$)— chain is longer, the compound will be all the less water-soluble; it will thus be appropriate in such a case to increase the number of hydrophilic sites.

It will also be obvious that increasing the carbon condensation of the products under consideration, or envisaging more complicated technical equivalents, does not present any advantages and, on the contrary, leads to higher costs. There is thus a natural limit to the products that can be used in practice.

Products A and E above, as well as their derivatives, are preferred according to the invention by reason of associated advantages.

The properties of products A to F above are, however, perfectly comparable, as it will emerge from a study of the following examples.

EXAMPLE 1

The efficiency of the reducing agent/catalyst couples according to the invention were tested with regard to the reduction of Fe 3+ to Fe 2+ in a very to extremely acid medium.

The criterion adopted was the quantity of Fe(3+) reduced in two minutes, for a reducing agent concentration of $3.10^{-3}$ mole.

The results are grouped together in Table 1 herebelow.

For all the acid concentrations in the Table, except at 28% HCl, the catalytic system consists of:

at 20° C., $0.05.10^{-3}$ mole CUCl$_2$ at 90° C., $0.1.10^{-3}$ mole CUCl$_2$

For the acid medium at 28% HCl, the catalytic system consists of the combination of:

$0.20.10^{-3}$ mole CUCl$_2$ and of $0.10.10^{-3}$ mole of KI both at 20° C. and at 90° C.

Purely by way of example, it may be preferred to use a slight excess of reducer in relation to the stoichiometry of the reduction reaction.

EXAMPLE 2

In the same test as that presented in the Table corresponding to Example 1, the compounds below, which include hydrophilic functions but no mercaptan function, gave no result that could be used according to the invention:
Ethylene glycol OH—CH$_2$—CH$_2$—OH Ethylamine CH$_3$—CH$_2$—NH$_2$Lactic acid CH$_3$—CH(OH)—COOH

EXAMPLE 3

Examples of Compositions Preventing Sludge Formation

Example 3.1

Use is made of a Canadian "Judy Creek" crude oil, at 90° C. A Fe 3+ content of 20 000 ppm was established.

To pass the test, it was essential for the composition for the control of iron in acid and in the presence of the usual additives to be stable for at least 4 hours at the surface temperature (20° C.), to have phase stability (no phase separation) representing 4 hours at least in the presence of ferric ions at the borehole static temperature (BHST) of 90° C., to have a return time with two separate phases ("breakout") of 10 minutes, for a 50/50 mixture of crude oil and 15% HCl, after manual emulsification for 1 minute after heating the acid for 1 hour, and, finally, for it to pass through a mesh of 100 (US mesh; 0.149 mm) without leaving any deposits after heating has been continued for 30 minutes.

The composition below perfectly satisfied all the above criteria, including the absence of sludge.

| | |
|---|---|
| Corrosion inhibitor containing an amine | 10 l/m$^3$ |
| Anionic surfactant | 10 l/m$^3$ |
| Surfactant | 30 l/m$^3$ |
| Demulsifier | 5 l/m$^3$ |
| NH$_4$ thioglycolate (at 60%) (reducing agent) | 50 l/m$^3$ |
| CuCl$_2$, 2 H$_2$O (catalyst) | 1 kg/m$^3$ |

Example 3.2

A test was carried out on a Canadian "Boundary Lake" crude oil containing 10 000 ppm of Fe3+, at 50° C., with 28% HCl, with the following composition:

| | |
|---|---|
| Corrosion inhibitor | 6 l/m$^3$ |
| Anionic surfactant | 25 l/m$^3$ |
| Surfactant | 40 l/m |
| Demulsifier | 10 l/m$^3$ |
| Mutual solvent | 40 l/m$^3$ |
| NH$_4$ thioglycolate (at 60 %) (reducing agent) | 20 l/m$^3$ |
| CuCl$_2$, 2 H$_2$O } catalytic system | 2 kg/m$^3$ |
| KI | 1 kg/m$^3$ |

We note the absence of sludge formation.

The fluid is stable and remains clear.

The "break-out" time is 5 minutes.

The composition tested satisfied all the criteria in the field.

To our knowledge, this is the first time that such a result has been obtained, especially when we consider the very high level of acidity (HCl 28%).

What is claimed is:

1. An acidic fluid for the treatment of a well penetrating a subterranean formation including an iron control agent comprising:

(a) a reducing agent having the formula:

$$H-S-R$$

TABLE (See Example 1)

| REDUCING AGENT | TEMP. °C. | ACID MEDIUM | | | | |
|---|---|---|---|---|---|---|
| | | 5% HCl | 15% HCl | 28% HCl | 4% HCl + 0.5% HF | 12% HCl + 3% HF |
| | | QUANTITY OF FE 3+ REDUCED (in $10^{-3}$ mole) | | | | |
| Ammonium thioglycolate $HSCH_2C(=O)ONH_4$ | 20 | 2.9 | 2.7 | 2.5 | 2.9 | 2.8 |
| | 90 | 2.9 | 2.6 | 2.4 | 2.9 | 2.7 |
| Thioglycolic acid $HSCH_2C(=O)OH$ | 20 | | 2.6 | 2.3 | | |
| | 90 | | 2.4 | 2.3 | | |
| Methyl thioglycolate $HSCH_2C(=O)OCH_3$ | 20 | | 2.8 | | | |
| | 90 | | 2.7 | | | |
| Mercaptoethanol $HSCH_2-CH_2OH$ | 20 | 2.7 | 2.8 | 0.6 | 2.2 | 2.2 |
| | 90 | 2.9 | 2.9 | 0.9 | 2.9 | 2.9 |
| Cysteamine $HSCH_2-CH_2NH_2HCl$ | 20 | 3.1 | 2.6 | 3.1 | 3 | 3 |
| | 90 | 3.4 | 2.2 | 3 | 3 | 3 |
| Thioglycerol $HSCH_2-CH(OH)-CH_2OH$ | 20 | 3 | 2.6 | 2.95 | 2.9 | 2.8 |
| | 90 | 2.9 | 2.5 | 2.8 | 3 | 2.7 |
| Cysteine $HSCH_2-CH(NH_2)-COOH$ | 20 | | 2.7 | | | |
| | 90 | | | | | |
| Thiolactic acid $CH_3-CH(SH)-COOH$ | 20 | | 2.6 | | | | wherein R is selected from a group consisting of an aliphatic group having at least one hydrophilic function, a cycloaliphatic group having at least one hydrophilic function and a

—CH$_2$—Z group wherein Z is an aromatic group having at least one hydrophilic function; and (b) a reduction catalyst comprising cupric or cuprous ions, or a combination of cupric or cuprous ions and iodine or iodide ions.

2. The fluid as set forth in claim 1, wherein the reducing agent is selected from a group consisting of:

A. HS—CH$_2$—COOH

A'. HS—CH$_2$—COOCH$_3$

A". HS—CH$_2$—COO—M wherein M is an alkali or alkaline earth metal or ammonium ion B. HS—CH$_2$—CH—COOH and its Na, Ca, NH$_4^+$ salts NH$^2$ soluble alkyl esters

C. HS—CH$_2$—CH$_2$—OH

D. HS—CH$_2$—CH$_2$—NH$_2$, HCl

E.

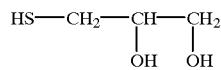

F. CH$_3$—CH—(SH)—COOH and its Na, Ca, NH$_4^+$ salts and soluble alkyl esters.

3. The fluid as set forth in claim 1, characterized in that the fluid contains;

20 000 ppm of Fe 3$^+$,

15% of acid, 50 l/m$^3$ of ammonium thioglycolate representing 60% by weight, and, 1 kg/m$^3$ of CuCl$_2$. 2H$_2$O.

4. The fluid as set forth in claim 1, wherein the reducing agent is selected from the group consisting of:

A. HS—CH$_2$—COOH

A'. HS—CH$_2$—COOCH$_3$

A". HS—CH$_2$—COO—M wherein M is an alkali or alkaline earth metal or ammonium ion

B.

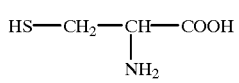

and its Na, Ca, NH$_4^+$ salts and soluble alkyl esters

C. HS—CH$_2$—CH$_2$—OH

D. HS—CH$_2$—CH$_2$—NH$_2$. HCl

E.

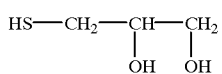

F. CH$_3$—CH(SH)—COOH and its Na, Ca, NH$_4^+$ salts and soluble alkyl esters.

5. The fluid as set forth in claim 1 including an effective amount of said reducing agent as is necessary for the reduction of Fe $3^{l+}$ ion dissolved in said fluid.

6. The fluid as set forth in claim 1 further including hydrochloric acid.

7. The fluid as set forth in claim 1 including about 3 to about 28 percent acid.

8. A process for removing rust deposits from a well comprising the steps of circulating a fluid in accordance with claim 1 through the well.

* * * * *

UNITED STATES PATENT AND TRADEMARK OFFICE
CERTIFICATE OF CORRECTION

PATENT NO.   : 6,306,799 B1
DATED        : October 23, 2001
INVENTOR(S)  : Jean Pierre Feraud et al.

It is certified that error appears in the above-identified patent and that said Letters Patent is hereby corrected as shown below:

Column 9,
Lines 13-28, replace claim 2 as follows:

2. The fluid as set forth in claim 1, wherein the reducing agent is selected from the group consisting of:

A.   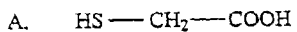 HS—CH$_2$—COOH

A'.  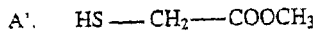 HS—CH$_2$—COOCH$_3$

A".  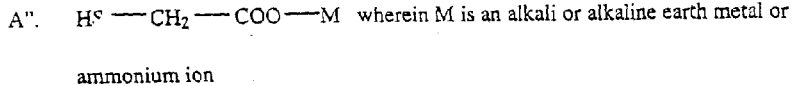 HS—CH$_2$—COO—M   wherein M is an alkali or alkaline earth metal or ammonium ion B.   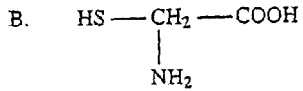 HS—CH$_2$—COOH
                              |
                            NH$_2$ and its Na, Ca, NH$_4^+$ salts and soluble alkyl esters C.   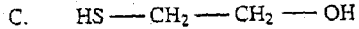 HS—CH$_2$—CH$_2$—OH D.   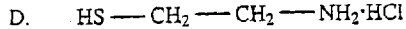 HS—CH$_2$—CH$_2$—NH$_2$·HCl E.   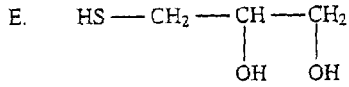 HS—CH$_2$—CH—CH$_2$
                                    |      |
                                   OH    OH Signed and Sealed this Seventeenth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,306,799 B1  Page 1 of 1
DATED : October 23, 2001
INVENTOR(S) : Jean Pierre Feraud et al.

It is certified that error appears in the above-identified patent and that said Letters Patent is hereby corrected as shown below:

<u>Column 10,</u>
Line 1, Claim 4 should read:

The fluids set forth in claim 1 characterized in that the fluid contains:

- 20 000 ppm of $Fe_3^+$,

- 28 % of acid [notably containing, or consisting of, hydrochloric acid,]

- 20 1/m$^3$ of ammonium thioglycolate representing 60 % by weight,

- 2 kg/m$^3$ of $CuCl_2 \cdot 2H_2O$ and,

- 1 kg/m$^3$ of KI.

Signed and Sealed this

Twenty-third Day of March, 2004

JON W. DUDAS
*Acting Director of the United States Patent and Trademark Office*